(12) United States Patent
Kim et al.

(10) Patent No.: US 7,279,249 B2
(45) Date of Patent: Oct. 9, 2007

(54) ORGANIC ELECTROLYTIC SOLUTION AND LITHIUM BATTERY EMPLOYING THE SAME

(75) Inventors: Hansu Kim, Seoul (KR); Myung-Dong Cho, Hwaseong-si (KR); Gue-Sung Kim, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 367 days.

(21) Appl. No.: 10/866,680

(22) Filed: Jun. 15, 2004

(65) Prior Publication Data

US 2004/0258996 A1  Dec. 23, 2004

(30) Foreign Application Priority Data

Jun. 17, 2003 (KR) .................. 10-2003-0039123

(51) Int. Cl.
*H01M 4/58* (2006.01)
*H01M 6/16* (2006.01)

(52) U.S. Cl. .............. 429/231.9; 429/231.95; 429/338

(58) Field of Classification Search ............. 429/231.9, 429/231.95, 338
See application file for complete search history.

(56) References Cited

U.S. PATENT DOCUMENTS 5,352,548 A    10/1994  Fujimoto ............... 429/197
5,626,981 A    5/1997   Simon .................. 429/105
5,695,887 A    12/1997  Amatucci et al. ......... 429/48
5,712,059 A    1/1998   Barker ................. 429/197
5,714,281 A    2/1998   Naruse ................. 429/197
6,045,950 A *  4/2000   Chang .................. 429/306
6,048,637 A    4/2000   Tsukaha ................ 429/53
6,114,070 A    9/2000   Yoshida ................ 429/332
6,291,107 B1 * 9/2001   Shimizu ................ 429/324

FOREIGN PATENT DOCUMENTS

JP          11-273724        10/1999

* cited by examiner

*Primary Examiner*—Dah-Wei Yuan
*Assistant Examiner*—Karie O'Neill
(74) *Attorney, Agent, or Firm*—H.C. Park & Associates, PLC

(57) ABSTRACT

An organic electrolytic solution containing an organic solvent and a compound that contains an anionic polymerization monomer with an added component capable of being chelated with a lithium metal cation. A lithium battery may utilize the organic electrolytic solution. The lithium battery may have improved stability to reductive decomposition, reduced first cycle irreversible capacity, and improved charging/discharging efficiency and lifespan. Moreover, reliability of the battery may be improved because the battery, after formation and standard charging at room temperature, may not swell beyond a predetermined thickness. Even when the lithium battery swells significantly at a high temperature, the capacity of the lithium battery may be high enough for practical applications due to its recovery capacity.

11 Claims, No Drawings

ORGANIC ELECTROLYTIC SOLUTION AND LITHIUM BATTERY EMPLOYING THE SAME

This application claims the benefit of Korean Patent Application No. 2003-39123, filed on Jun. 17, 2003, which is hereby incorporated by reference for all purposes as if fully set forth herein.

BACKGROUND OF THE INVENTION

1. Field of the Invention

The present invention relates to an organic electrolytic solution and a lithium battery employing the same, in particular, to an organic electrolytic solution and a lithium battery with enhanced reliability.

2. Discussion of the Related Art

A lot of research regarding batteries as a driving energy source has been conducted to minimize battery weight for, and meet sophisticated technology requirements of, portable electronic devices such as video cameras, cellular phones and laptop computers. Particularly, rechargeable lithium batteries have three times the energy density per unit weight as conventional lead storage batteries, nickel-cadmium batteries, nickel-hydro batteries and nickel-zinc batteries, and they can be recharged in a short time.

A lithium battery cathode is typically composed of an active material including transition metal compounds such as $LiNiO_2$, $LiCoO_2$, $LiMn_2O_4$, $LiFePO_4$, $LiNi_xCo_{1-x}O_2$, $Ni_{1-x-y}Co_xMn_yO_2$, or oxides containing the transition metal compounds and lithium. A lithium battery anode is typically composed of an active material including lithium metal, a lithium metal alloy or a carbonaceous material, and a graphite material. Electrolytes are categorized as liquid or solid electrolytes, according to electrolytic type. Liquid electrolytes raise many safety problems including the potential danger of fires due to the outflow and destruction of batteries from evaporation. Hence, many researchers have suggested using solid electrolytes instead.

Many studies have focused on solid electrolytes, and on solid polymer electrolytes particularly, because solid polymer electrolytes are unlikely to leak electrolytic solution, and they are easy to process. Solid polymer electrolytes are further categorized into full solid types and gel types, where the full solid types do not contain an organic electrolytic solution, while the gel types do.

Generally, conventional aqueous electrolytic solutions are not suitable for lithium batteries mainly because they may react violently with lithium, which is used as an anode. Thus, an organic electrolytic solution in which a lithium salt is dissolved is used instead. The organic solvent may have high ionic conductivity, a high dielectric constant and low viscosity. But it is very difficult to obtain a single organic solvent having all three of these characteristics. As a result, a mixed solvent composed of an organic solvent having a high dielectric constant and an organic solvent having a low dielectric constant, or a mixed solvent composed of an organic solvent having a high dielectric constant and an organic solvent having low viscosity, is used as is an organic solvent for lithium batteries.

U.S. Pat. Nos. 6,114,070 and 6,048,637 disclose a mixed solvent composed of a linear carbonate and a cyclic carbonate, such as a mixture of dimethyl carbonate or diethyl carbonate, and ethylene carbonate or propylene carbonate, to improve the organic solvent's ionic conductivity. In general, the mixed solvent can be used only at 120° C. or lower, because if the temperature rises above 120° C., a battery using the mixed solvent may swell due to the gas generated from its vaporization.

Alternatively, the utilization of 20% or greater of vinylene carbonate (VC) has been suggested as a main organic solvent of an organic electrolytic solution (U.S. Pat. Nos. 5,352,548, 5,712,059, and 5,714,281). When vinylene carbonate is used as the main solvent, however, charge/discharge characteristics may be degraded and high-rate characteristics may be decreased because vinylene carbonate has a lower dielectric constant than ethylene carbonate, propylene carbonate and γ-butyrolactone.

U.S. Pat. No. 5,626,981 discloses a battery in which a surface electrolyte interface (SEI) is formed on the surface of a cathode during initial charge/discharge due to VC in an electrolytic solution, and U.S. Pat. No. 6,291,107 discloses a battery in which a polymer film is formed on the surface of a carbonaceous anode material by a monomer capable of electrochemical anionic polymerization (anionic polymerization monomer) during the initial charging. In Japanese Patent Laid-open Publication No. 2001-223154, a vinyl-based compound such as vinyl acetate is introduced in the form of an additive.

However, improving the adhesion between the polymer film and the surface of the carbonaceous anode material is desired because the adhesion in conventional batteries may not be strong enough to appropriately inhibit side reactions, such as the decomposition of the electrolytic solution.

SUMMARY OF THE INVENTION

Accordingly, the present invention is directed to an organic electrolytic solution and lithium battery employing the same that substantially obviates one or more of the problems due to limitations and disadvantages of the related art.

The present invention provides an organic electrolytic solution to control the deterioration of a lithium battery due to repeated charge/discharge cycles.

The present invention also provides a lithium battery that utilizes the organic electrolytic solution.

Additional features of the invention will be set forth in the description which follows, and in part will be apparent from the description, or may be learned by practice of the invention.

The present invention discloses an organic electrolytic solution including an organic solvent and a compound comprised of an anionic polymerization monomer to which a component that can be chelated with a lithium metal cation is added.

The present invention also discloses a lithium battery comprising a cathode, an anode, a separator interposed therebetween, and the organic electrolytic solution.

It is to be understood that both the foregoing general description and the following detailed description are exemplary and explanatory and are intended to provide further explanation of the invention as claimed.

DETAILED DESCRIPTION OF THE INVENTION

In an exemplary embodiment of the present invention, a compound, which contains an anionic polymerization monomer with an added component capable of being chelated with a lithium metal cation, is included in an organic electrolytic solution during initial charging. The compound is in a liquid state at room temperature, and even at high temperatures, there is little increase in the battery's internal pressure due to vapor pressure because the compound has similar physical characteristics (for example, boiling point) as ethylene carbonate and propylene carbonate.

The anionic polymerization monomer is polymerized during a battery's initial charging, thereby forming a polymer film on the carbonaceous anode surface. The component capable of chelating with a lithium metal cation strengthens the adhesion between the polymer film and a lithiated graphite anode. This process may inhibit the decomposition of a solvent on the carbonaceous anode surface because the polymer film's strong adhesion with the graphite may prevent carbonaceous anode surface exposure due to the change in carbonaceous anode volume, thereby extending the battery's lifespan.

The anionic polymerization monomer may have an allyl group and/or a group derived from a compound containing a vinyl group capable of an anionic polymerization, or other like substances. Compounds containing a vinyl group capable of an anionic polymerization include isoprene, 2-vinylpyridine, acrylic acid, methacrylic acid, styrene, butadiene, acrylonitrile, and other like substances. The component capable of chelating with a lithium metal cation is a group derived from at least one compound of oxalate, acetoacetate, malonate, or other like substances. More particularly, examples of the anionic polymerization monomer or a compound containing a vinyl group capable of anionic polymerization include at least one of 2-(methacryloyloxy) ethyl acetoacetate, allylacetoacetate, vinyl aceto acetate, divinyl oxalate, diallylmalonate, divinylmalonate, diallyl oxalate, and other like substances.

The amount of the compound containing the anionic polymerization monomer may be in a range of about 0.1 to 1 parts by weight based on 100 parts by weight of the organic solvent. If the amount of the compound is less than about 0.1 parts by weight, the ability to suppress the battery's swelling may be minimal. On the other hand, if the amount of the compound is more than about 1 part by weight, the polymer film may become thicker, leading to an increase in battery impedance.

The organic solvent included in an organic electrolytic solution according to an exemplary embodiment of the present invention may include a solvent having high dielectric constant and a solvent having a low boiling point.

The solvent having a high dielectric constant is at least one of ethylene carbonate, propylene carbonate, butylene carbonate, γ-butyrolactone, or other like substances, and the solvent having a low boiling point is at least one of dimethyl carbonate, ethylmethyl carbonate, diethyl carbonate, dipropyl carbonate, dimethoxyethane, diethoxyethane, $C_1$-$C_{20}$ fatty acid ester derivatives, or other like substances. The amount of the solvent having a high dielectric constant is in a range of about 30-99.9% by volume of the organic solvent, and the amount of the solvent having a low boiling point is in a range of about 0.1-70% by volume. If the solvent having the high dielectric constant is outside the range noted above, the thickness of the battery may increase and/or the charge/discharge characteristics may become poor.

The lithium salt included in an organic electrolytic solution according to an exemplary embodiment of the present invention may include any lithium salt that is commonly used for lithium batteries. The lithium salt used in the present embodiment may be at least one of $LiClO_4$, $LiCF_3SO_3$, $LiPF_6$, $LiN(CF_3SO_2)$, $LiBF_4$, $LiC(CF_3SO_2)_3$, and $LiN(C_2F_5SO_2)_2$. The concentration of the lithium salt in an electrolytic solution of an exemplary embodiment of the present invention may be in a range of about 0.5-2 Molarity (M).

Additional description of a lithium battery employing the electrolytic solution according to an exemplary embodiment of the present invention and a method of fabricating the lithium battery follows.

The exemplary embodiments of the present invention include primary lithium batteries and secondary, or rechargeable, lithium batteries.

A cathode active material, a conducting agent, a binder and a solvent are mixed together to prepare a cathode active material composition, which may be directly coated on an aluminium current collector and then dried to form a cathode plate. Alternatively, the cathode active material composition may be cast on the surface of a support, and then the surface of an aluminium current collector is laminated with a cathode active film detached from the surface of the support to form a cathode plate.

The cathode active material may be a metal oxide containing lithium, including $LiCoO_2$, $LiMn_xO_{2x}$, $LiNi_{1-x}Mn_xO_{2x}$, where x=1, 2, or $Ni_{1-x-y}Co_xMn_yO_2$. Carbon black may be used for the conducting agent. The binder may be vinylidene fluoride/hexafluoropropylene copolymer, polyvinylidenefluoride, polyacrylonitrile, polymethylmethacrylate, or polytetrafluoroethylene, a combination of these, or styrene butadiene rubber polymer. The solvent may be N-methylpyrrolidone, acetone, or water. The amounts of the cathode active material, conducting agent, binder, and solvent in the present exemplary embodiment are typical levels for lithium batteries.

An anode active material, a conducting agent, a binder and a solvent are mixed together to prepare an anode active material composition in the same manner as described above for the cathode active material composition. The anode active material composition may be directly coated on a copper current collector and then dried to form an anode plate. Alternatively, the anode active material composition may be cast on the surface of a support, and then a copper current collector is laminated with an anode active film detached from the surface of the support to form an anode plate.

The anode active material may be lithium metal, a lithium alloy, a carbonaceous material or graphite. In the anode active material composition, the conducting agent, the binder and the solvent are the same as those in the cathode active material composition. A plasticizer may be added to the cathode and anode active material compositions to form porous cathode and anode plates.

Any separator that is commonly used in lithium batteries can be used in the present embodiment. Exemplary materials for the separator include glass fiber, polyester, Teflon, polyethylene, polypropylene, polytetrafluoroethylene(PTEE), or a combination of these, which may be in non-woven fabric or woven fabric form. These preferred materials allow electrolytic solution ions to migrate smoothly, and they have the ability to retain a larger amount of electrolytic solution. A separator made of polyethylene, polypropylene, or the like, which can be rolled, may be used for a lithium ion battery, and a separator that may retain a larger amount of organic electrolytic solution may be used for a lithium ion polymer battery. Separators may be manufactured as follows.

First, a polymer resin, a filler, and a solvent are mixed together to prepare a separator composition.

The surface of an electrode is directly coated with the separator composition and then dried to form a separator.

Alternatively, the separator composition can be cast on the is surface of a support and dried, and an upper portion of the electrode is laminated with the separator detached from the support.

Any polymer resin that can be used as a binder for electrode plates may be used, including a vinylidenefluoride/hexafluoropropylene copolymer, polyvinylidenefluoride, polyacrylonitirile, polymethylmethacrylate, or a mixture of these. The polymer resin may also be a vinylidenefluoride-hexafluoropropylene copolymer having about 8-25% by weight of hexafluoropropylene.

The separator is interposed between the cathode and anode plates to form an electrode assembly. The electrode assembly is rolled or folded, and then sealed in a cylindrical or rectangular battery case. Finally, to complete the manufacturing of the lithium battery, an organic electrolytic solution is injected into the battery case. Alternatively, the separator and the cathode and anode plates may be stacked upon one another to form a bi-cell structure. This structure is then soaked in an organic electrolytic solution and sealed in a pouch to complete the manufacturing of the lithium ion polymer battery.

The organic electrolytic solution of the present exemplary embodiment may be used in lithium polymer batteries employing a polymer electrolyte, as well as in the lithium battery described above. Additionally, the organic electrolytic solution of the present exemplary embodiment may be applied to lithium sulfur batteries. The lithium battery according to the present exemplary embodiment may be in general electronic devices and in portable electronic devices.

The manufacturing process for a lithium sulfur battery according to an exemplary embodiment of the present invention is described below.

The manufacturing process of a lithium sulfur battery in accordance with an exemplary embodiment of the present invention is similar to that of the secondary lithium battery of the previous exemplary embodiment, except that the cathode forming material is different. A protection layer may be formed between an anode and a separator to prevent lithium from reacting with an electrolytic solution.

The cathode forming material may be at least one of lithium composite oxide, simple substance sulfur, kasolite in which $Li_2S_n$, where $n \geq 1$, is dissolved, organic sulfur, $(C_2S_x)_y$, where $2.5 \leq x \leq 20$, $y \geq 2$, or other like substances. The anode may be a lithium metal electrode, a lithium metal alloy electrode such as a lithium-aluminum electrode, a lithium-magnesium electrode, a lithium-silicon electrode, a lithium-inert sulfur composite electrode, or other like substances.

EXAMPLE 1

0.25 g of 2-(methacryloyloxy) ethyl acetoacetate (Ace), added as an additive to 100 g of an organic solvent, the 100 g of an organic solvent containing 30% by volume of ethylene carbonate, 10% by volume of propylene carbonate, and 60% by volume of ethylmethyl carbonate, and $LiPF_6$ were added into a mixture to prepare a 1.0 M electrolytic solution.

A two-electrode battery based on Li metal ($2.5*4$ cm$^2$)/ electrolytic solution/graphite anode ($1*1$ cm$^2$) that has a small specific surface area was manufactured, and then the secondary electrode battery was run three times at a scan rate of 1 mV/sec by cyclic voltammetry (CV) in a range from 2.5 V to 0 V, as measured against a reference electrode.

EXAMPLES 2-3

An electrolytic solution was manufactured in the same manner as in Example 1 except that amounts of Ace were 0.5 g and 1 g, respectively, instead of 0.25 g in Example 1. The electrochemical measurements were taken in the same manner as in Example 1.

COMPARATIVE EXAMPLE 1

An electrolytic solution was prepared in the same manner as in Example 1, except that Ace was not used. 1.0 M of $LiPF_6$ and a graphite anode having a small specific surface area were added in the form of a lithium salt to the electrolytic solvent to manufacture a battery, and then the electrochemical measurement was taken in the same manner as in Example 1.

COMPARATIVE EXAMPLE 2

A battery was manufactured in the same manner as in Example 1, except that 2 g of vinylcarbonate was added as the additive to the organic solvent instead of Ace, and then the electrochemical measurement was taken in the same manner as in Example 1.

Charge/discharge efficiency of the batteries manufactured according to Examples 1-3 and Comparative Examples 1-2 was measured after initial charge/discharge cycling. The results are tabulated in Table 1.

TABLE 1

| | Amount of Ace (parts by weight) (based on 100 parts by weight of an organic solvent) | Cycle Efficiency (%) of 1st cycle | Capacity (mAh/g) of 1st cycle |
|---|---|---|---|
| Example 1 | 0.25 parts by weight | 93.2 | 350 |
| Example 2 | 0.5 parts by weight | 93.8 | 348 |
| Example 3 | 1 part by weight | 93.1 | 336 |
| Comparative Example 1 | 0 parts by weight no alternative | 88.7 | 347 |
| Comparative Example 2 | 0 parts by weight 2 parts by weight, vinylcarbonate, as alternative | 94.2 | 352 |

Referring to Table 1, Examples 1-3, the charge/discharge efficiency increases when the Ace is added as compared to Comparative Example 1, where no Ace was added. Therefore, the Ace has a similar effect of vinylene carbonate when used as an additive. Furthermore, side reactions, such as the decomposition of the electrolyte, may decrease because of the charge/discharge efficiency increase, thereby preventing the battery thickness from increasing.

When using an organic electrolytic solution according to the exemplary embodiments of the present invention, a lithium battery may have improved stability to reductive decomposition, reduced first cycle irreversible capacity, and improved charging/discharging efficiency and lifespan. Moreover, the battery's reliability may be improved because the battery may not swell beyond a predetermined thickness after formation and standard charging at room temperature. Even when the lithium battery swells significantly at a high temperature, its capacity is high enough for practical applications due to its recovery capacity. Generally, the recovery capacity is measured to determine whether a battery can maintain its original capacity after exposure to high temperatures. When the charge/discharge cycle becomes longer, conventional batteries become thicker, but a battery according to an exemplary embodiment of the present invention may swell slightly within an acceptable range. Thus, the battery's reliability is improved.

When the organic electrolytic solution according to an exemplary embodiment of the present invention is used in the manufacturing process for a lithium battery, the irreversible capacity may be decreased. Furthermore the charge/discharge efficiency and the lifetime of the battery may be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An organic electrolytic solution comprising:
   an organic solvent; and
   a compound;
   wherein the compound further comprises an anionic polymerization monomer and a component that can be chelated with a lithium metal cation added to the anionic polymerization monomer, and
   wherein the anionic polymerization monomer comprises at least one material selected from the group consisting of 2-(methacryloyloxy)ethyl acetoacetate, allylacetoacetate, vinyl acetoacetate, divinyl oxalate, diallyl oxalate, divinylmalonate, and diallylmalonate.

2. The organic electrolytic solution of claim 1, wherein the component that can be chelated with a lithium metal cation is a group derived from at least one material selected from the group consisting of oxalate, acetoacetate, and malonate.

3. The organic electrolytic solution of claim 1, wherein the amount of the compound is in a range of 0.1-1 parts by weight based on 100 parts by weight of the organic solvent.

4. The organic electrolytic solution of claim 1, wherein the organic solvent comprises a solvent having a high dielectric constant in the range of 30-99.9% by volume and a solvent having a low boiling point in the range of 0.1-70% by volume.

5. The organic electrolytic solution of claim 4, wherein the solvent having the high dielectric constant is comprised of at least one material selected from the group consisting of ethylene carbonate, propylene carbonate, butylene carbonate and y-butyrolactone.

6. The organic electrolytic solution of claim 4, wherein the solvent having the low boiling point is comprised of at least one material selected from the group consisting of dimethylcarbonate, ethyl methyl carbonate, diethyl carbonate, dipropyl carbonate, dimethoxyethane, diethoxyethane and $C_1$-$C_{20}$ fatty acid ester derivatives.

7. The organic electrolytic solution of claim 1, further comprising a lithium salt, wherein a concentration of the lithium salt is in a range from 0.5 to 2 M.

8. A lithium battery comprising:
   a cathode;
   an anode;
   a separator interposed between the cathode and the anode; and
   an organic electrolytic solution comprising an organic solvent and a compound, wherein the compound further comprises an anionic polymerization monomer and a component that can be chelated with a lithium metal cation added to the anionic polymerization monomer, and
   wherein the anionic polymerization monomer comprises at least one material selected from the group consisting of 2-(methacryloyloxy)ethyl acetoacetate, allylacetoacetate, vinyl acetoacetate, divinyl oxalate, diallyl oxalate, divinylmalonate, and diallylmalonate.

9. The lithium battery of claim 8, wherein the cathode comprises at least one material selected from the group consisting of lithium composite oxide, simple substance sulfur, kasolite in which $Li_2S_n$ where $1 \leq n$ is dissolved, organic sulfur, and $(C_2S_x)_y$ where $2.5 \leq x \leq 20$, $2 \leq y$.

10. The lithium battery of claim 8, wherein the anode comprises a lithium metal electrode, a lithium metal alloy electrode, a lithium-magnesium electrode, a lithium-silicon electrode, a lithium inert sulfur composite electrode, a carbonaceous electrode or a graphite electrode.

11. The lithium battery of claim 8, wherein the organic electrolytic solution further comprises a lithium salt, wherein a concentration of the lithium salt is in a range from 0.5 to 2 M.

* * * * *